Patented July 17, 1951

2,560,881

UNITED STATES PATENT OFFICE 2,560,881

QUICK-DRYING WRITING INKS

Raymond L. Mayhew, Phillipsburg, N. J., assignor to General Aniline & Film Corporation, New York, N. Y., a corporation of Delaware No Drawing. Application May 29, 1948, Serial No. 30,209

11 Claims. (Cl. 106—20)

This invention relates to the preparation of greenish-blue to bluish-green writing inks of the quick-drying type.

It is known to prepare brightly colored quick-drying inks by the use of dyestuffs and caustic alkali, the penetrative quality of the caustic alkali causing the ink to be rapidly absorbed by the paper. Up to the present, however, a commercially satisfactory greenish-blue to bluish-green writing ink of this kind has not been produced. This has been due to the instability to caustic alkali of the dyestuffs heretofore employed in the formulation of the inks, the dyestuffs undergoing breakdown during storage to decomposition products which either caused sludge formation in the ink or gave a color thereto radically different in shade from that of the original solution of the dyestuff.

It is an object of the present invention to provide greenish-blue to bluish-green caustic alkali-containing quick-drying writing inks of improved color stability. Further objects will become apparent as the description proceeds.

I have found that the above objects may be accomplished by employing as dyestuffs for quick-drying writing inks of the aforementioned type, certain dilute aqueous caustic alkali-soluble derivatives of copper phthalocyanines of the benzene series.

The term copper phthalocyanines of the benzene series as used herein means tetraazaporphins in which each of the four pyrrole nuclei is fused to a phenylene nucleus and copper is contained in the molecule in complex combination.

The dyestuffs for the inks of the present invention are copper phthalocyanines of the benzene series containing attached to the phenylene nuclei of the phthalocyanine molecule one or more polyhydroxyalkyl sulfonamide groups. They may be prepared by reacting a polyhydroxyalkyl primary or secondary amine with the corresponding copper phthalocyinane sulfonylchlorides at elevated temperature, preferably, however, at room or even lower temperatures in the presence of water or other suitable reaction diluent. The number of these sulfonamide groups will vary depending on the number of sulfonylchloride groups on the phenylene nuclei of the starting copper phthalocyanine. In some instances, the dyestuffs may contain attached to the phenylene nuclei, in addition to the sulfonamide group or groups, one or more sulfonic acid groups, either free or in the form of the amine salt, or other substituents, such as halogenations, e. g., chlorine, or amino or carboxy groups, etc. By varying the number of these polyhydroxyalkylsulfonamide groups on the phenylene nuclei and by proper selection of the ratio of hydroxy groups to the length of the alkyl chain or chains of the sulfonamide group, the higher this ratio, the greater the solubilizing effect of the sulfonamide group, copper phthalocyanine sulfonamides may be obtained which are soluble in dilute aqueous caustic alkali, e. g., sodium, potassium, or lithium hydroxide, etc.

Among the primary and secondary polyhydroxyalkylamines which may be employed for the production of the dyestuffs are, for example, 2-amino-2-methyl-1,3-propanediol [1,1-bis(hydroxymethyl-1-aminoethane], 2-amino-2-ethyl-1,3-propanediol [1,1-bis(hydroxymethyl)-1-aminopropane], tris(hydroxymethyl)aminomethane, glucosamine (2-aminoglucose), 1-aminoglucose, diethanolamine [bis(hydroxyethyl)amine], 1-methylamino-2,3-propanediol, 1-ethylamino-2,3-propanediol, etc. A preferred class of amines are the polyalkanol amines which may be prepared by the condensation of nitroparaffins with aldehydes followed by reduction of the nitro group, for example, the aforementioned 2-amino-2-methyl-1,3-propanediol [$NH_2(CH_3)C(CH_2OH)_2$] and tris(hydroxymethyl)-aminomethane [$NH_2C(CH_2OH)_3$].

The starting copper phthalocyanine sulfonylchlorides employed in the preparation of the dyestuffs may be obtained by reacting chlorosulfonic acid with the corresponding copper phthalocyanines at an elevated temperature as described in U. S. P. 2,219,330. They may also be made from the corresponding copper phthalocyanine sulfonic acids or their salts by treatment with phosphorus pentachloride.

The invention is further illustrated by the following specific examples which are illustrative of the preparation of the dyestuffs from copper phthalocyanine sulfonylchlorides and polyhydroxyalkyl amines. Parts are by weight unless otherwise noted.

Example 1

Ten parts of copper phthalocyanine tetrasulfonylchloride in the form of a dry powder is added with stirring to 50 parts of water in which has been dissolved 10 parts of tris(hydroxymethyl) aminomethane. Stirring is continued for several hours at room temperature until dissolution is complete. The resulting solution is then poured into 200 volumes of 10% hydrochloric acid to precipitate the dyestuff which is filtered off and dried. The bright blue powder obtained dyes cotton, wool and silk a vivid greenish-blue shade. It is soluble in water, aqueous ammonia and in dilute aqueous caustic alkali with a brilliant greenish-blue coloration.

Example 2

Ten parts of 2-amino-2-methyl-1,3-propanediol is dissolved in 50 parts of water and 10 parts of copper phthalocyanine tetrasulfonylchloride is added thereto with stirring. After stirring the mixture for 10-14 hours at room temperature, the resulting solution is poured into 250 volumes of 10% hydrochloric acid and the precipitated dyestuff filtered off and dried. The greenish-blue powder obtained is valuable as a dye for fibers, particularly silk. It is soluble in water, aqueous ammonia and in dilute aqueous caustic alkali with a brilliant bluish-green coloration.

Example 3

A mixture of:

10 parts copper phthalocyanine tetrasulfonylchloride
10 parts diethanolamine
60 parts water is stirred for several hours at room temperature and the resulting dyestuff isolated as described in Example 1.

Example 4

Fifty parts copper phthalocyanine tetrasulfonylchloride in the form of a presscake is added to 100 parts of water in which has been dissolved 10 parts of glucosamine hydrochloride. Sodium carbonate is then added until the reaction mixture is basic and the whole stirred for 20-24 hours at room temperature, after which the dyestuff is isolated in the manner of the preceding examples.

Example 5

Twenty parts of copper phthalocyanine sulfonylchloride (mixture containing a substantial proportion of the di- and trisulfonylchloride derivatives) is stirred into 100 parts of water containing 20 parts of tris(hydroxymethyl)-aminomethane and the mixture stirred overnight at room temperature. The resulting dyestuff is isolated in the manner of the preceding examples. A bright blue powder is obtained which is somewhat less soluble in a dilute aqueous caustic alkali than that of Example 1.

Example 6

Twenty parts of copper phthalocyanine monosulfonylchloride is stirred into 100 parts of water in which has been dissolved 10 parts of tris(hydroxymethyl)aminomethane. This mixture after being stirred for several hours at room temperature is poured into 250 volumes of 10% hydrochloric acid and the precipitated dyestuff filtered and dried. A blue powder is obtained which is less soluble in dilute aqueous caustic alkali than that of Example 5.

Quick-drying inks may be prepared in accordance with the invention by dissolving a small amount of one of the phthalocyanine polyhydroxyalkylsulfonamides in a dilute aqueous solution of a caustic alkali, e. g., sodium, potassium or lithium hydroxide. Sodium hydroxide generally is to be used because of its lower cost. The concentration of the dyestuff and caustic alkali may be varied depending on the depth of shade and rate of drying desired in the ink. The caustic alkali should be used in concentrations corresponding to those disclosed in U. S. P. 1,932,248 and, described in terms of sodium hydroxide, it should not be below 0.5% and generally may be about 0.8% to about 2½% or slightly more.

Other ingredients found desirable in the art and which do not interfere with the functioning of the dyestuffs may be contained in the inks. As described in the aforesaid U. S. P. 1,932,248, starch may be used for preventing feathering of the ink on the paper, bentonite for improving its flow characteristics and, where required by usage in the trade for greater permanency, alkali soluble metal salts which on exposure to light give colored oxides, e. g., ammonium metavanadate or potassium ferro-cyanide. Small amounts, a fraction of 1% by weight based on the ink, of wetting agents resistant to dilute caustic alkali may be used to further speed up the absorption of the ink by the paper. The amount of the wetting agent should not be great enough to cause feathering of the ink which in each case, can be determined by simple test. A hygroscopic agent, such as sorbitol, glycerol, etc., may be added to the ink to keep the point of the pen moist when exposed to the atmosphere.

A specific formula for the prepartion of quick-drying writing inks in accordance with the invention is as follows:

| | |
|---|---|
| Copper phthalocyanine sulfonamide (product of Example 1) | Three parts |
| Sodium hydroxide | Two parts |
| Sodium N-oleyl-N-methyl-taurate | Fraction of one part |
| Glycerol | One part |
| Water | One hundred parts |

The above solution represents an attractive greenish-blue writing ink of excellent stability. It is permanent in character and the writing therefrom is still legible after soaking the paper in water for 24 hours. Depending on the particular phthalocyanine polyhydroxyalkylsulfonamide employed as the colorant, the shade of the ink may vary from greenish-blue to bluish-green.

As various other embodiments of the invention will occur to those skilled in the art, it is not intended that the scope of the patent be limited except as is required by the prior art and the appended claims.

I claim:
1. A quick-drying writing ink comprising in solution a copper phthalocyanine of the benzene series having attached to the phenylene nuclei at least one hydroxyalkylsulfonamide group, a hydroscopic polyhydric alcohol, water and caustic alkali, the content of caustic alkali in the ink being equivalent to from about one-half to two and one-half percent of sodium hydroxide.

2. A quick-drying writing ink comprising in solution a copper phthalocyanine of the benzene series having attached to the phenylene nuclei a plurality of hydroxyalkylsulfonamide groups, a hygroscopic polyhydric alcohol, water and caustic alkali, the content of caustic alkali in the ink being equivalent to from about one-half to two and one-half percent of sodium hydroxide.

3. A quick-drying writing ink as defined in claim 2, wherein the solution contains a wetting agent.

4. A quick-drying writing ink comprising in solution a copper phthalocyanine of the benzene series having attached to the phenylene nuclei a plurality of 1,1-bis(hydroxymethyl)-1-ethylsulfonamide groups, a hygroscopic polyhydric alcohol, water and caustic alkali, the content of caustic alkali in the ink being equivalent to from about one-half to two and one-half percent of sodium hydroxide.

5. A quick-drying writing ink comprising in solution a copper phthalocyanine of the benzene series having attached to the phenylene nuclei a plurality of tris(hydroxymethyl)methylsulfonamide groups, a hygroscopic polyhydric alcohol, water and caustic alkali, the content of caustic alkali in the ink being equivalent to from about one-half to two and one-half percent of sodium hydroxide.

6. A quick-drying writing ink as defined in claim 5, wherein the solution contains a wetting agent.

7. A quick-drying writing ink as defined in claim 5, wherein the caustic alkali is sodium hydroxide.

8. A quick-drying writing ink as defined in claim 7, wherein the solution contains a wetting agent.

9. A quick-drying writing ink comprising in solution a copper phthalocyanine of the benzene series having attached to the phenylene nuclei a plurality of N-bis (hydroxyethyl)sulfonamide groups, a hygroscopic polyhydric alcohol, water and caustic alkali, the content of caustic alkali in the ink being equivalent to from about one-half to two and one-half percent of sodium hydroxide.

10. A quick-drying writing ink as defined in claim 9, wherein the solution contains a wetting agent.

11. A quick-drying writing ink as defined in claim 9, wherein the caustic alkali is sodium hydroxide.

RAYMOND L. MAYHEW.

REFERENCES CITED

The following references are of record in the file of this patent:

UNITED STATES PATENTS

| Number | Name | Date |
|---|---|---|
| 2,172,699 | Siegel | Sept. 19, 1939 |
| 2,361,009 | Carman | Oct. 24, 1944 |
| 2,426,194 | Fischbach et al. | Aug. 26, 1947 |

FOREIGN PATENTS

| Number | Country | Date |
|---|---|---|
| 520,199 | Great Britain | Apr. 17, 1940 |

OTHER REFERENCES

Ellis: "Printing Inks" (1940), pages 221 and 280.